(12) United States Patent
Paull

(10) Patent No.: US 9,512,937 B2
(45) Date of Patent: Dec. 6, 2016

(54) METHOD AND APPARATUS FOR DIGGING AND INSTALLING CURVED SEWERS

(71) Applicant: Philip Paull, Noblesville, IN (US)

(72) Inventor: Philip Paull, Noblesville, IN (US)

( * ) Notice: Subject to any disclaimer, the term of this patent is extended or adjusted under 35 U.S.C. 154(b) by 0 days.

(21) Appl. No.: 14/987,938

(22) Filed: Jan. 5, 2016

(65) Prior Publication Data
US 2016/0208956 A1    Jul. 21, 2016

Related U.S. Application Data

(60) Provisional application No. 62/099,621, filed on Jan. 5, 2015.

(51) Int. Cl.
| | | |
|---|---|---|
| *F16L 1/10* | (2006.01) | |
| *E02D 17/08* | (2006.01) | |
| *E02F 5/10* | (2006.01) | |
| *F16L 1/036* | (2006.01) | |

(52) U.S. Cl.
CPC ............. *F16L 1/10* (2013.01); *E02D 17/086* (2013.01); *E02F 5/10* (2013.01); *F16L 1/036* (2013.01); *E02D 2600/10* (2013.01)

(58) Field of Classification Search
CPC ...... E02D 17/08; E02D 17/083; E02D 17/086; F16L 1/10
USPC ........................................ 405/157, 282, 283
See application file for complete search history.

(56) References Cited

U.S. PATENT DOCUMENTS

| | | | | |
|---|---|---|---|---|
| 3,879,132 A * | 4/1975 | Myeress | ............... | G01C 15/002 33/1 H |
| 4,480,942 A * | 11/1984 | Farrow | ................... | F16L 1/036 294/67.2 |
| 4,741,646 A * | 5/1988 | Hatch | ..................... | E02F 5/104 37/348 |
| 5,145,290 A * | 9/1992 | Wise | ......................... | F16L 1/06 404/101 |
| RE34,576 E * | 4/1994 | Camilleri | ................. | E02D 5/18 405/267 |
| 5,707,175 A * | 1/1998 | Geelhoed | ................ | F16L 1/036 405/174 |
| 5,991,013 A * | 11/1999 | Eslambolchi | ............ | G01V 8/16 324/326 |
| 2005/0117973 A1* | 6/2005 | Nelson | .................... | F16L 1/036 405/184.5 |
| 2006/0171782 A1* | 8/2006 | Neiwert | .................. | F16L 1/028 405/179 |
| 2007/0177945 A1* | 8/2007 | Paull | ........................ | E02F 5/12 405/174 |
| 2011/0079584 A1* | 4/2011 | Hees | ...................... | E21B 19/16 219/61 |

* cited by examiner

*Primary Examiner* — Frederick L Lagman
(74) *Attorney, Agent, or Firm* — C. John Brannon; Brannon Sowers & Cracraft PC

(57) ABSTRACT

A system for digging sewer pipe trenches without the need of manholes, including a pair of oppositely disposed parallel elongated sidewalls defining a work volume therebetween, at least one support member extending between the sidewalls, and a location guidance assembly positionable within. The guidance assembly includes a pair of spaced parallel elongated positioning members, at least one elongated connection member extending between the positioning members, a GPS sensor operationally connected to each positioning member, a laser support member connected to one of the elongated positioning members, a mounting connection connected to the laser support member; and a laser connected to the laser support member. A movement actuator is coupled to the location guidance assembly, wherein energization of the actuator moves the laser between a first position and a second position in the working volume.

8 Claims, 8 Drawing Sheets

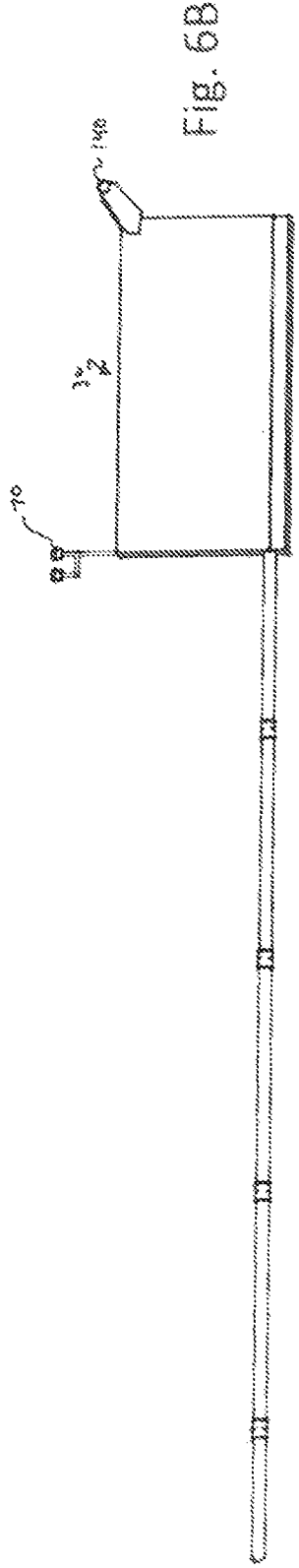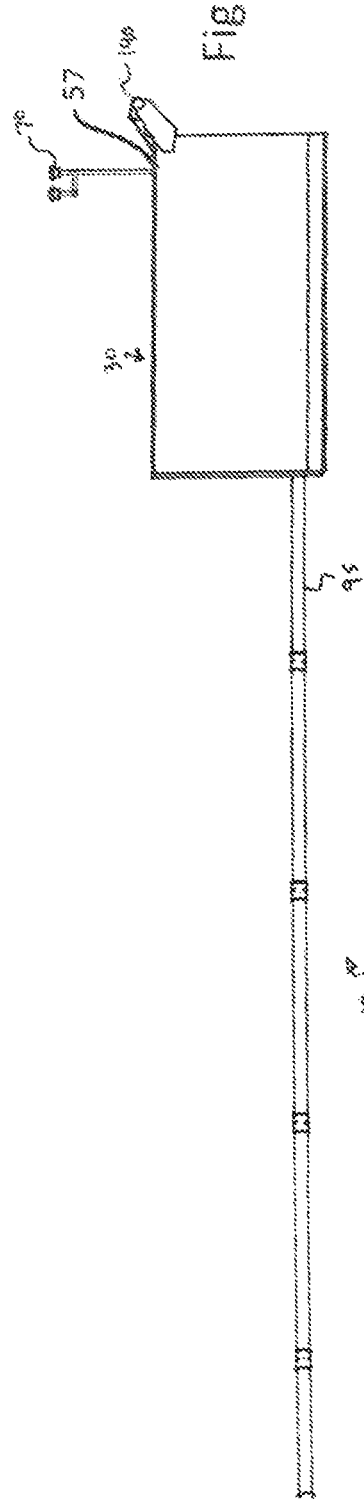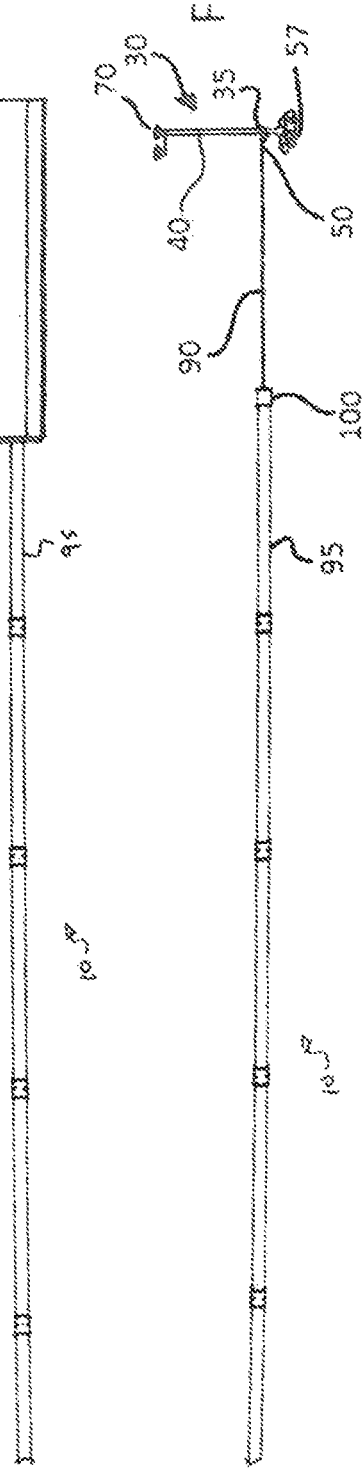

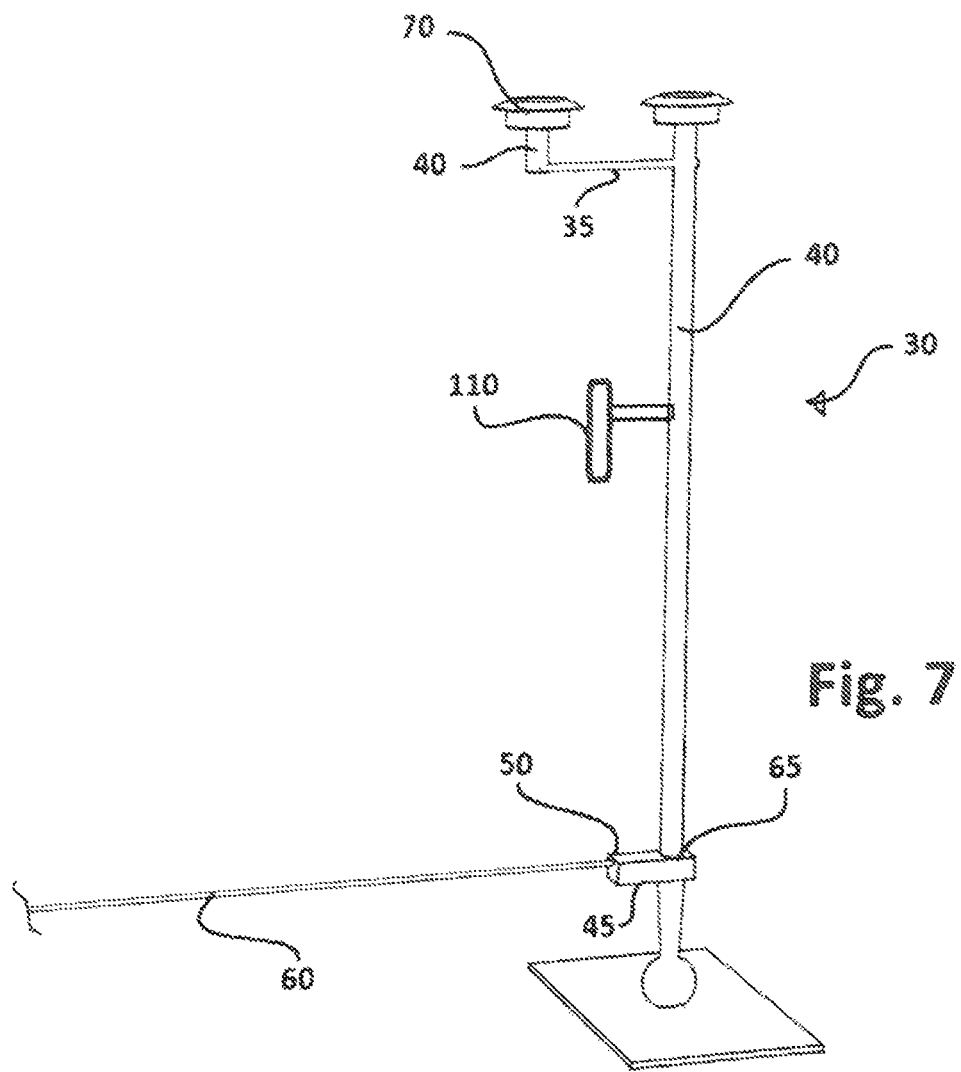

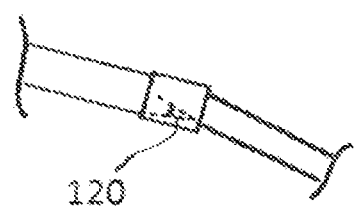
Fig. 8
Fig. 9
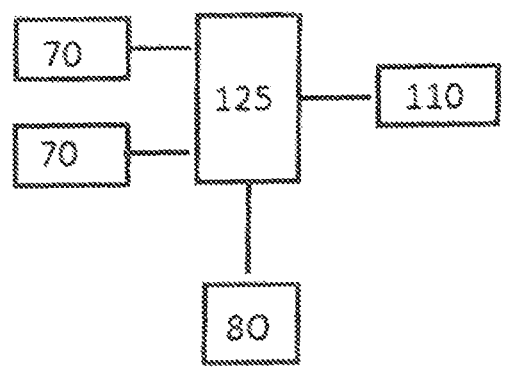

METHOD AND APPARATUS FOR DIGGING AND INSTALLING CURVED SEWERS

CROSS-REFERENCE TO RELATED APPLICATIONS

This patent application claims priority to U.S. Provisional Patent Application Ser. No. 62/099,621, filed on Jan. 5, 2015.

TECHNICAL FIELD

The present novel technology relates generally to the field of excavation, and, more particularly, to a method and apparatus for digging curved sewer trenches and installing sewer pipe therein.

BACKGROUND

Sewer lines are typically dug according to a laser guide beam shone from a point of origin to a point of destination. Accordingly, sewer lines are dug in straight segments extending from manhole to manhole. Typically, the sewer line is dug and the pipe laid in the freshly dug ditch in one single operation. The laser is fired through the as-laid pipe, and the excavator maintains grade and course using the laser as a reference. Thusly, the resulting sewer pipe is linear.

This technique has the drawback of allowing the sewer line to change direction only at junction points, as the laser guide is fired through the already-placed pipe as it is installed. Typically, these junction points are manholes. A manhole represents extra materials, time and expense to construct. Further, by digging the sewer line in straight segments, easements must typically be acquired, representing still more expense. Finally, straight segments connected at junction points are inherently inefficient, as they require more materials and time to construct than would otherwise be necessary.

Thus, there is a need for a method and apparatus that would allow the digging of sewer ditches and installation of sewer piping while following a nonlinear or curved course. The present novel technology addresses this need.

BRIEF DESCRIPTION OF THE DRAWINGS

FIG. 6A is a side wire frame cutaway schematic view of the system of FIG. 1

FIG. 6B is a side wire frame cutaway schematic view of a second embodiment curved sewer pipe excavation system.

FIG. 6C is a side wire frame cutaway schematic view of a third, boxless and handheld embodiment curved sewer pipe excavation system.

FIG. 7 is an enlarged partial view of the frame portion of FIG. 1.

FIG. 8 is an enlarged partial view of the pipe segments of FIG. 1.

FIG. 9 is a schematic view of the relationship between the sensors and controller portions of the system of FIG. 1.

DETAILED DESCRIPTION OF THE PREFERRED EMBODIMENT

Figure 1:
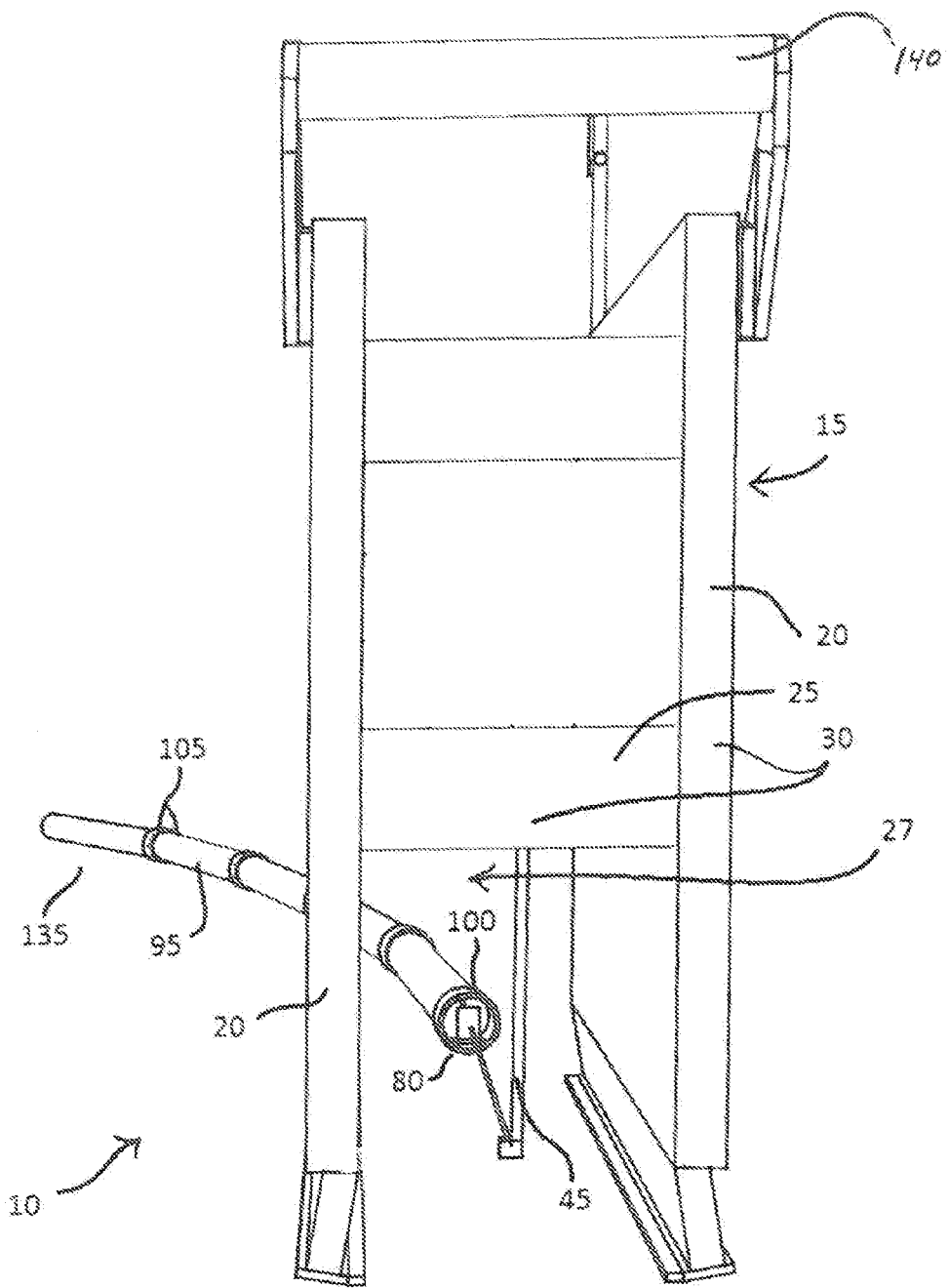
FIG. 1 is a front perspective view of a first embodiment curved sewer pipe excavation system of the present novel technology.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Figure 2:
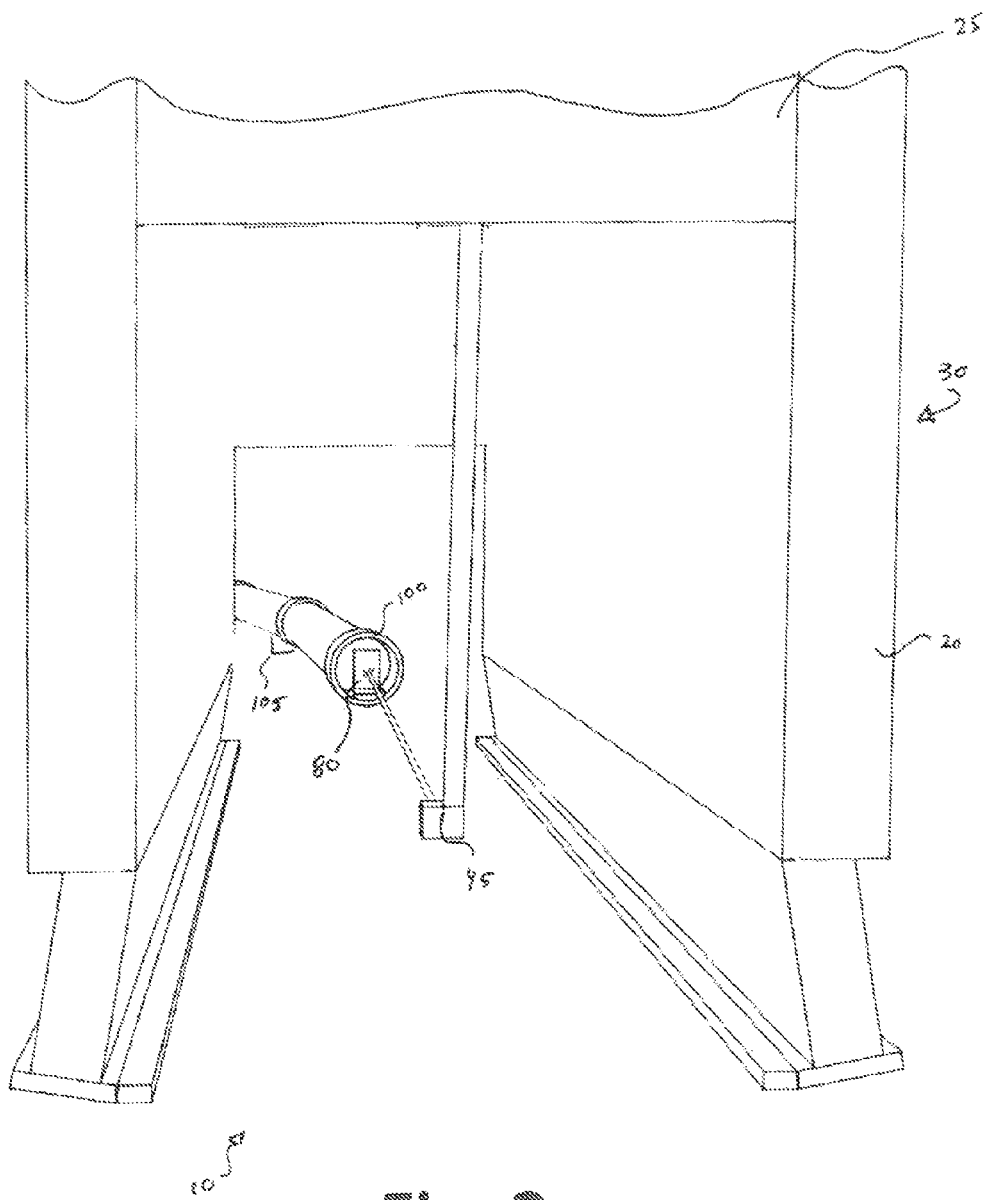
FIG. 2 is an enlarged view of FIG. 1.
Figure 3:
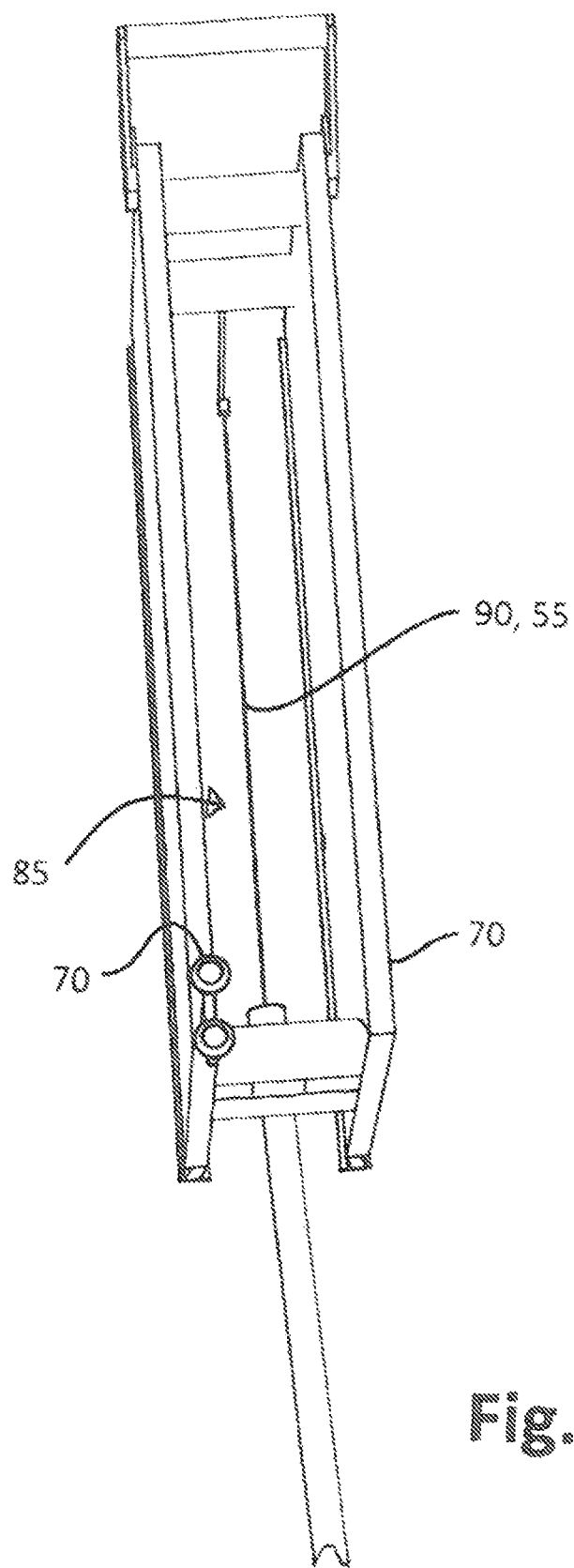
FIG. 3 is a top perspective view of the system of FIG. 1.
Figure 4:
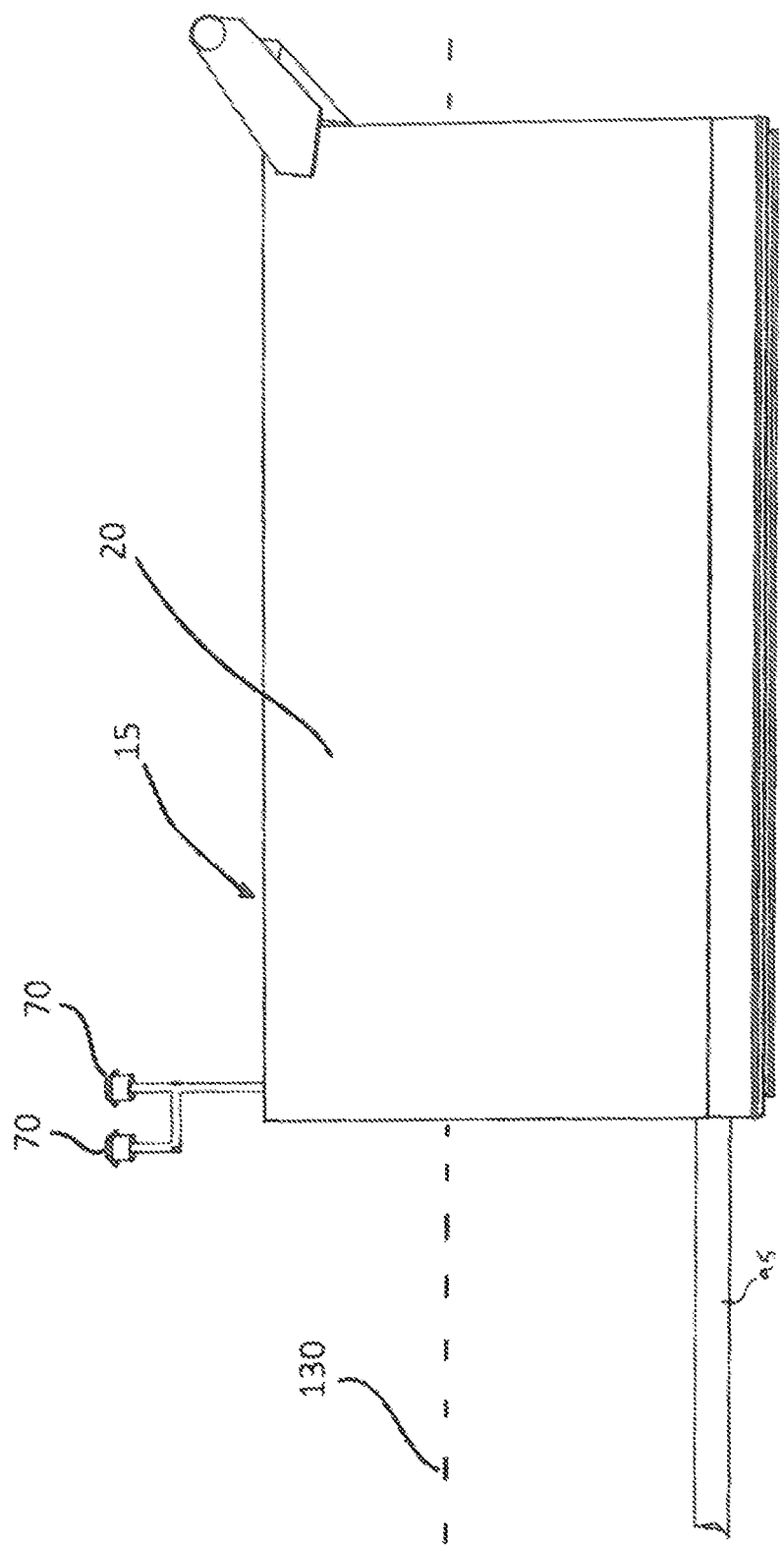
FIG. 4 is a side perspective view of the system of FIG. 1.
Figure 5:
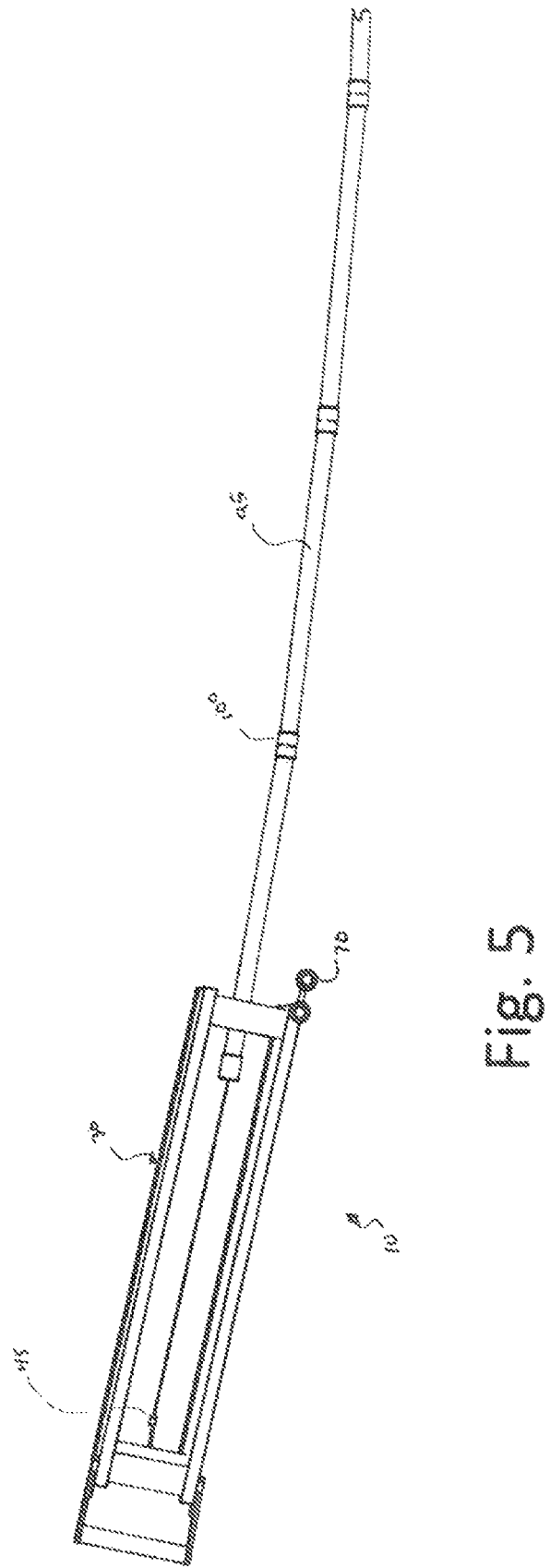
FIG. 5 is a top schematic view of the system of FIG. 1.

As illustrated in FIGS. 1 through 9, the present novel technology relates to a system 10 for digging nonlinear or curved sewers and installing sewer piping therein. The system 10 includes an excavation or trench box 15 defining two generally parallel elongated side walls 20 separated by structural members 25 extending therebetween and defining a working volume 27 therein. The excavation box 15 further includes a location guidance frame assembly or portion 30 slidably or movably connected therein. The frame assembly 30 typically includes a generally horizontal spacer member 35 connected to at least one, and more typically two, generally vertical positioning support members 40. The frame portion 30 may be moved horizontally (i.e., in a direction parallel to the sidewalls) such as by a screw drive, chain drive, or the like. The frame portion 30 may be moved vertically (i.e., in a direction opposite the pull of gravity) such as by a screw drive, chain drive, or the like. The box 15 may be moved horizontally by being grabbed and pulled by an excavator, such as a track hoe or the like.

The frame assembly 30 further includes a guidance support member 45 extending (typically perpendicularly) from a support member 40 or the spacer member 35, for supporting a straight-line generator 50. A straight-line generator 50, typically a laser, is typically connected to the generally horizontally disposed horizontal support member 45. Alternately, other straight-line generating devices 50 may be used in place of lasers. The horizontal member 45 is typically configured to move back and forth along its major axis 55, thus moving the laser 50 horizontally in the box 15. This may be accomplished by moving the entire assembly 30 or by independently moving or pivoting the support member 45. Typically, the frame portion 30 is connected to a movement actuator 57, such as a slideable support member positioned atop the sidewalls 20, a tractor plate from which at least one elongated member 35 extends, or the like.

The laser generator 50 is typically pivotable relative to the horizontal member 35, and more typically may be pivoted around a pivot axis 60, which may be a vertical axis or a nonvertical axis. For example, the mounting connection 65 affixing the laser 50 to the horizontal member 35 may be a turntable, a gimbal, or the like. Alternately, the horizontal member 45 may be connected to the support member 35 by a similar mounting connection 65.

A pair of spatially separated position sensors 70, typically GPS units, are connected to the excavation box 15. The GPS units 70 are typically separated by sufficient distance such that the position of the box 15, and thus the laser 50, may be acquired and triangulated without the necessity of movement of the box 15. Alternately, other location beacon devices may be used in place of the GPS units.

In operation, the excavation box 15 is placed into a ditch in which it is desired to lay a sewer pipe. The assembly 30 is positioned in the box 15 to shine the laser 50 toward a point of origin. The point of origin may be the most recent segment of sewer pipe, a manhole junction, or the like. A laser target 80 is placed in the point of origin, and the laser 50 is directed to the point of origin target 80. The ditch segment 85 between the laser generator 50 and the target 80 is excavated and/or backfilled until the frame 30 can be horizontally moved such that the beam 90 from the laser generator 50 hits the target 80, indicating that grade has been achieved. The laser bean 90 shines alone the major axis 55, which is also the major axis 55 of the pipe segment 95 to be placed in the ditch segment 85 and connected at the point of origin. The next pipe segment 95 is then placed into the ditch segment 85 and connected to the previous pipe segment 95 via a bell connection 100 at the desired angle 105. The two pipe segments 95 are connected at a slight angle 105, accommodated by the bell connection 100. The position of the laser 50 is fixed relative to the GPS units 70, each of which is typically connected to a respective vertical member 40. Typically, an indicator 110 is operationally connected to the GPS units 70 and positioned visible to the excavator to display in which direction (i.e., slightly to the left of the major axis 130 of the box 15, along the major axis 130, or slightly to the right of the major axis 130 of the box 15) the next ditch segment 85 should be dug. The angle of deviation to the left or the right typically is less than the maximum angle 120 at which the pipe segments 95 may be connected at the bell 100. The next portion of the ditch 85 is then dug, and the process is repeated.

During the excavation process, the frame 30 may be retracted upward and into the box 15, to protect the laser generator equipment 50 and make digging and/or moving the box 15 easier.

The GPS receiver units 70 are typically operationally connected to a computer 125. The position of the laser generator 50 is fixed relative to each receiver unit 70, and thus data from the two GPS receiver units 70 allows the position of the laser generator 50 to be substantially precisely and accurately calculated. Further, the pipe segments 95 are of known and standard length, thus the position of the target 80 placed into the bell 100 of the most recently positioned pipe segment 85 may likewise be calculated if the laser beam 90 is directed perpendicularly back from the frame 30 (i.e., along or parallel to the major axis 55 of the horizontal member 35 or a major axis 130 of the box 15). If the desired course of the completed sewer pipe 135 is likewise programmed into the computer 125, the computer 125 may then direct the excavator or operator in his excavation of the sewer line 135, much like GPS navigation directs a driver.

In some embodiments, a drag bar 140 is operationally connected to one or both sidewalls 20.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. A system for digging sewer pipe trenches without the need of manholes, comprising:
   a pair of oppositely disposed parallel elongated sidewalls defining a work volume therebetween;
   at least one support member extending between the sidewalls; and
   a location guidance assembly positionable within the work volume and further comprising:
   a pair of spaced parallel elongated positioning members;
   at least one elongated connection member extending between the positioning members;
   a respective positioning sensor operationally connected to each respective positioning members;
   a straight-line generator support member operationally connected to one of the elongated positioning members;
   a mounting connection operationally connected to the straight-line generator support member; and
   a straight-line generator operationally connected to the straight-line generator support member; and
   a movement actuator operationally coupled to the location guidance assembly;
   wherein energization of the actuator moves the straight-line generator between a first position and a second position in the working volume.

2. The system of claim 1 and further comprising a drag bar operationally connected to at least one sidewall.

3. The system of claim 1 wherein the straight-line generator is a laser and wherein the respective positioning sensors are GPS units.

4. The system of claim 1 wherein the pair of oppositely disposed parallel elongated sidewalls and the at least one support member extending between the sidewalls define a trench box.

5. The system of claim 1 wherein the mounting connection mounting connection is a gimbal.

6. A method of laying pipe in a trench, comprising:
   a) digging a trench segment;
   b) positioning a location guidance assembly within a trench box;
   c) positioning the trench box in the trench segment;
   d) positioning a laser target at a point of origin;
   e) shining a laser from location guidance assembly onto the laser target;
   f) positioning a pipe segment in the trench, wherein one end of the pipe segment is positioned at the point of origin;
   g) orienting the pipe segment at the preferred angle; and
   h) connecting the pipe segment at the point of origin;
   i) digging another trench segment; and
   j) advancing the trench box into a newly dug trench segment;
   wherein the location guidance assembly further comprises:
   a pair of spaced parallel vertically-oriented elongated positioning members;
   at least one horizontally-oriented elongated connection member extending between the positioning members;
   a respective GPS positioning sensor operationally connected to each respective positioning members;
   a laser support member operationally connected to one of the elongated positioning members;
   a mounting connection operationally connected to the laser support member; and a laser operationally connected to the laser support member.

7. The method of claim 6, further comprising:
k) before b), calculating the position of the location guidance assembly based on the point of origin, the desired orientation of a pipe segment extending from the point of origin, the length of the pipe segment, the desired position of the laser, and the desired position of the respective GPS units, wherein the special relationship between the respective GPSD units and the laser are known constants and a straight line extending between the desired position of the laser and the point of origin defines the major axis of the pipe segment.

8. The method of claim 6 and further comprising after d) and before e), pivoting the laser to define the connection angle between the pipe segment and the point of origin.

* * * * *